United States Patent [19]
Blumenstein et al.

[11] Patent Number: 5,104,936
[45] Date of Patent: Apr. 14, 1992

[54] THERMOPLASTIC MOLDING MATERIAL

[75] Inventors: Uwe Blumenstein; Adolf Echte, both of Ludwigshafen; Peter Klaerner, Battenberg, all of Fed. Rep. of Germany

[73] Assignee: BASF Aktiengesellschaft, Ludwigshafen, Fed. Rep. of Germany

[21] Appl. No.: 507,738

[22] Filed: Apr. 12, 1990

[30] Foreign Application Priority Data

May 11, 1989 [DE] Fed. Rep. of Germany ....... 3915363

[51] Int. Cl.$^5$ .................... C08L 51/04; C08L 55/02
[52] U.S. Cl. ........................................ 525/85; 525/86
[58] Field of Search .................................. 525/85, 86

[56] References Cited

U.S. PATENT DOCUMENTS

| 3,509,237 | 4/1970 | Aubrey . |
| 4,214,056 | 7/1980 | Lavengood . |
| 4,330,641 | 5/1982 | Echte et al. . |
| 4,366,289 | 12/1982 | Keskkula et al. . |
| 4,634,734 | 1/1987 | Hambrecht et al. ............ 525/85 |

FOREIGN PATENT DOCUMENTS

| 0081761 | 6/1983 | European Pat. Off. . |
| 1273180 | 7/1968 | Fed. Rep. of Germany . |

OTHER PUBLICATIONS

Polymer, vol. 28, Nov., (1987); "Methyl Methacrylate Grafted Rubbers as Impact Modifiers for Styrenic Polymers", Keskkula et al., pp. 2063-2069.

Polymer, vol. 28, Sep., (1987); "Synergistic Toughening in Rubber Modified Blends", Fowler et al., pp. 1703-1711.

ACS Symposium Polym. Mater. Sci. Eng., vol. 57, (1987), Keskkula et al., pp. 674-678.

Primary Examiner—Jacob Ziegler
Attorney, Agent, or Firm—Oblon, Spivak, McClelland, Maier & Neutstadt

[57] ABSTRACT

Molding materials comprising a matrix of high impact polystyrene and rubber incorporated in the form of discrete particles contain not less than 50% by weight of polystyrene A and an effective amount of up to 50% by weight of a graft rubber B. The graft rubber B consists of from 40 to 95% by weight of an elastomeric core $b_1$ and from 5 to 60% by weight of a shell $b_2$, i.e. from 5 to 50% by weight of a first shell $B_{21}$ of styrene and from 50 to 95% by weight of a second shell $b_{22}$ of from 60 to 90% by weight of styrene and from 10 to 40% by weight of acrylonitrile, A and B, $b_1$ and $b_2$, $b_{21}$ and $b_{22}$ and styrene and acrylonitrile each summing to 100% by weight.

2 Claims, No Drawings

THERMOPLASTIC MOLDING MATERIAL

The present invention relates to an improved molding material based on high impact polystyrene.

A wide range of such molding materials are known and are commercially available.

However, it is still desirable to improve the stress cracking resistance (also under the influence of solvents), the adhesion properties for foams and the low temperature impact strength. Such properties are desirable in, for example, the construction of refrigeration units.

The relevant prior art includes, in particular
(1) German Published Application DAS 1,273,180
(2) U.S. Pat. No. 4,214,056
(3) U.S. Pat. No. 3,509,237
(4) U.S. Pat. No. 4,366,289
(5) H. Keskkula, D. R. Paul, K. M. McCreedy and D. H. Henton, Polymer 28 (1987), 2063-2069
(6) M. E. Fowler, H. Keskkula and D. R. Paul, Polymer 28 (1987), 1703-1711
(7) H. Keskkula, ACS Symposium Polym. Mater Sci. Eng. 57 (1987), 674-678
(8) U.S. Pat. No. 4,330,641.

(1) describes the extrusion of high impact polystyrene with an emulsion graft rubber which has a polybutadiene core and a polystyrene graft shell. In its impact strength, the product is superior both to the high impact polystyrene used and to a polystyrene toughened with only the emulsion graft rubber.

This effect is probably due to the synergistic interaction between the coarse-particled and fine-particled rubber phases, as disclosed, for example, in (2) and (3).

(4) to (7) describe the possibility of greatly increasing the impact strength by mixing a high impact polystyrene (having a coarse-particled rubber morphology) with a fine-particled emulsion rubber which has a polybutadiene core and a PMMA graft shell, although PMMA is incompatible with the polystyrene. The compatibility-imparting effect of such emulsion graft rubbers for PS and SAN matrices which are otherwise incompatible with one another is particularly noteworthy. (4) claims acrylates of the general formula $CH_1=C(R^1)-C(O)-R^2$ as the graft shell of the emulsion rubbers.

(8) discloses that a particle diameter greater than 3.5 $\mu m$ is necessary to increase the stress cracking resistance of high impact polystyrene (apart from copolymers) having a uniform rubber morphology.

We have found that blends of polystyrene with certain emulsion graft rubber grades can be obtained, i.e. having a core/shell emulsion rubber which has an S/SAN shell which is only partially compatible with polystyrene, and that such blends possess, inter alia, increased impact strength, improved foam adhesion and considerable stress cracking resistance.

The present invention relates directly to a molding material comprising a matrix of polystyrene or, preferably, high impact polystyrene and rubber incorporated in the form of discrete particles; the molding material consists predominantly, i.e. contains not less than 50% by weight, of polystyrene A and also of an effective amount of, for example, from not less than 10 to 50% by weight of a graft rubber B. According to the invention, this consists of from 40 to 95% by weight of an elastomeric core $b_1$ and from 5 to 60% by weight of a shell $b_2$; the shell $b_2$ is in turn, and according to the invention, composed of a first shell $b_{21}$, which accounts for from 5 to 50% by weight of the total shell $b_2$ and consists of styrene, and from 50 to 95% by weight of a second shell $b_{22}$. The second shell $b_{22}$ is composed of from 60 to 90% by weight of styrene $b_{221}$) and from 10 to 40% by weight of acrylonitrile $b_{222}$), A and B, $b_1$ and $b_2$, $b_{21}$ and $b_{22}$ and $b_{221}$ and $b_{222}$ summing in each case to 100% by weight.

The novel molding material preferably has the following composition:
from 60 to 90% by weight of A,
from 10 to 40% by weight of B,
from 50 to 90% by weight of $b_1$,
from 10 to 50% by weight of $b_2$,
from 7 to 40% by weight of $b_{21}$,
from 60 to 93% by weight of $b_{22}$,
from 65 to 85% by weight of $b_{221}$ and
from 15 to 35% by weight of $b_{222}$.

It may furthermore contain conventional assistants and additives and can be mixed in any ratio with other polymers which are suitable or compatible, for example with polyphenylene ethers. Some blends of this type have particularly advantageous properties.

For the preparation of the novel molding material, a specific emulsion graft rubber is mixed with high impact polystyrene. This molding material has the following advantages:

1. The advantageous properties of the molding material are achieved using an emulsion graft rubber whose shell contains SAN. This is novel and unexpected since SAN is known to be incompatible with polystyrene in any ratio (cf. for example Ullmanns Encyklopadie der technischen Chemie, Volume 6, (1981) 550).

2. As a result of mixing with this emulsion graft rubber, the impact strength and even the low temperature impact strength are improved What is novel is that, contrary to knowledge available to date, the stress cracking resistance to Frigen and the adhesion to polyurethane foam are also improved.

The stated combination of properties makes the novel molding material particularly suitable, for example, for refrigeration units.

Regarding the components, the following may be stated:

COMPONENT A

Component A is a conventional polystyrene, in particular a high impact polystyrene, which has a rubber content of from 3 to 25% by weight and is obtained by polymerization of styrene, preferably in the presence of a rubber.

The most commonly used process for the preparation of toughened styrene polymers are the mass and solution polymerization methods, as described in, for example, U.S. Pat. No. 2,694,692, and processes for mass suspension polymerization, as described in, for example, U.S. Pat. No. 2,862,692.

Some of the styrene can be replaced by minor amounts, for example up to 20% by weight, of styrene which is alkylated in the nucleus or in the side chain.

The rubber used is a natural or synthetic rubber conventionally employed for toughening styrene polymers. For the purposes of the present invention, suitable rubbers in addition to natural rubber are, for example, polybutadiene, polyisoprene, copolymers of butadiene and/or of isoprene with styrene and other comonomers or acrylate rubber, which have a glass transition temperature of less than $-20°$ C.

Suitable high impact polystyrenes are commercially available, and the median particle size ($d_{50}$ value of the integral mass distribution) can be from 0.2 to 7 μm with an intrinsic viscosity of the hardening matrix of from 50 to 100 ml/g (0.5% strength in toluene at 23° C.).

COMPONENT B

Component B has the features essential to the invention. It is an emulsion graft polymer whose elastomeric core may be a rubber conventionally used for toughening styrene polymers, as described above under Component A.

Preparation of the Elastomer $b_1$

The elastomer, the grafting base $b_1$, is prepared by polymerizing butadiene or n-butyl acrylate alone or together with the other comonomers in aqueous emulsion in a known manner at from 20° to 100° C., preferably from 50° to 80° C. Conventional emulsifiers, such as alkali metal salts of alkyl- or alkylarylsulfonic acids, alkylsulfites, fatty alcohol sulfonates, salts of higher fatty acids of 10 to 30 carbon atoms or resin soaps, may be used. The sodium salts of alkylsulfonates or fatty acids of 10 to 18 carbon atoms are preferably employed. It is advantageous to use the emulsifier in an amount of from 0.5 to 5, in particular from 0.5 to 2, % by weight, based on the monomers used in the preparation of the grafting base $b_1$. In general, a water/monomer ratio of from 2 : 1 to 0.7 : 1 is used. The polymerization initiators used are, in particular, the conventional persulfates, such as potassium persulfate, but it is also possible to use redox systems. The initiator is generally employed in an amount of from 0.1 to 1% by weight, based on the monomers used in the preparation of the grafting base $a_1$. The conventional buffer substances, by means of which pH is brought to, preferably, 6-9, for example sodium bicarbonate and sodium pyrophosphate, serve as further polymerization assistants; as a rule, from 0.1 to 3% by weight of a molecular weight regulator, such as mercaptans, terpinols or dimeric α-methylstyrene, are also used in the polymerization.

The exact polymerization conditions, in particular the type, metering and amount of emulsifier, are chosen specifically within the abovementioned ranges so that the resulting latex of the polymer $b_1$ has a $d_{30}$ value of about 75-750 nm, preferably 100-700 nm. Alternatively, the emulsion polymer having a median particle size of from 60 to 150 nm is agglomerated in a conventional manner (cf. German Published Application DAS 2,427,960).

Preparation of the Shell $b_2$

The shell, component $b_2$, has a 2-stage structure and is produced by successive polymerization of monomers $b_{21}$ and $b_{22}$ in two process steps in the presence of latex of elastomer $b_1$. For this purpose, styrene is used initially in the first process stage. The skilled worker knows how to achieve this object (the monomers are initially taken, addition during the polymerization and the like).

It is advantageous to carry out the graft copolymerization in aqueous emulsion under the conventional, abovementioned conditions. The graft copolymerization can advantageously be effected in the same system as the emulsion polymerization for the preparation of the grafting base $b_1$, and, if necessary, further emulsifier and initiator can be added. The monomer to be grafted can be added to the reaction mixture all at once, batchwise in a plurality of stages or, preferably, continuously during the polymerization. The graft copolymerization in the presence of the elastomer is carried out in such a way that the elastomeric core contains from 40 to 95%, preferably from 50 to 90%, of the emulsion graft rubber. Accordingly, the total shell $b_2$ contains from 5 to 60%, preferably from 10 to 50%.

The first shell $b_{21}$ accounts for from 5 to 50%, preferably from 7 to 40%, of the total shell $b_2$.

In a second stage, the graft copolymerization is then carried out using a monomer mixture of styrene ($b_{221}$) and acrylonitrile ($b_{22}$).

The second step of the graft copolymerization is also advantageously carried out in the same system; if necessary, further emulsifier and initiator can be added. The monomer mixture to be grafted, i.e. the mixture of styrene and acrylonitrile, can be added to the reaction mixture all at once, batchwise in a plurality of stages or, preferably, continuously during the polymerization. The graft copolymerization of the mixture of styrene and acrylonitrile in the presence of the reaction product from the first graft stage is carried out in such a way that the proportion of the second shell $b_{22}$ in the total shell is from 50 to 95%, preferably from 60 to 93%, and the ratio of $b_{221}$ to $b_{222}$ is from 60 : 40 to 90 : 10, preferably from 65 : 35 to 85 : 15. The graft copolymers should have median particle sizes of from 75 to 750 nm. Suitable conditions for the graft copolymerization for obtaining particle sizes in this range are known and are described in, for example, German Patent 1,260,135, German Laid-Open Application DOS 2,828,925 and J. Appl. Polym. Sci. 9 (1965), 2929-2938.

In addition to the pure graft copolymer, the rubber B also contains a smaller amount of a non-elastomeric hard component which is formed as a byproduct in the graft copolymerization and consists of free, non-grafted copolymers or homopolymers of the graft monomers. For the purpose of the present invention, these products are counted as component B.

In the Examples which follow, novel blends are compared with commercial polystyrene grades not according to the invention or with the basic toughened commercial polystyrene grades.

About 4.5 kg of each blend were prepared in an extruder from Werner & Pfleiderer, Model ZSK 30, at a melt temperature of 230° C. The stated percentages by weight (% by wt.) for the components of the blends are all based on a total weight of 4.5 kg.

The blends were compression molded to give test specimens, which were used to determine the following characteristics (the abbreviations used in the Tables are shown in parentheses):

1. The elongation at break (EB) in % according to DIN 53,455;
2. The notched impact strength ($a_{KL}$) in kJ/m² according to DIN 53,753;
3. The stress cracking resistance to low boiling halohydrocarbons as a relative residual elongation at break (RE); it was measured as follows:

In the test, polystyrene test specimens (according to No. 3, DIN 53,455) under flexural stress (170 mm arc radius) were exposed to an atmosphere of the halohydrocarbon R11 (0.5 bar). The residual elongation at break in % was determined after treatment for 50 minutes, by the tensile test according to DIN 53,455. The relative residual elongation at break is based on a reference test in air:

$$\text{Relative residual elongation at break} = \frac{\text{Residual elongation at break in } R11}{\text{Residual elongation at break in air}} \times 100\%$$

4. The adhesion to polyurethane foams; it was determined in the following test: Circular disks of 6 cm diameter, produced by compression molding, were placed on a surface and covered with a commercial expanding polyurethane mixture (spray can). After 24 hours, the pressed sheets were peeled off manually from the foam. The classification of good foam adhesion is used if the foam tears, and the classification of poor foam adhesion is applied in the case of separation without a residue at the high impact polystyrene/polyurethane foam interface.
5. Penetration tests according to DIN 53,443 on injection-molded test specimens (circular disks measuring 60×2 mm); the total damaging energy $W_{tot}$ in Nm is stated.

The following high impact polystyrenes A were used:
A1 A commercial high impact polystyrene containing 8% of polybutadiene and having an intrinsic viscosity of 70 ml/g and a median particle size of 2.7 μm.
A2 A high impact polystyrene containing 8% of polybutadiene and having an intrinsic viscosity of 69 ml/g and a particle size of 5.5 μm.

| | Emulsion rubbers B | | | |
|---|---|---|---|---|
| Designation | Core [% by wt.] | 1st shell [% by wt.] | 2nd shell [% by wt.] | Particle size $d_{50}$ [nm] |
| B1 | 60 n-butyl acrylate | 13 PS | 27 S/AN (75/25) | 500–600 |
| B2 (Comp.) | 65 PB-co-PS | 30 PMMA-co-PS | 5 PMMA | 150 |
| B3 (Comp.) | 78 PB | 22 PMMA | | 120 |
| B4 | 62 PB | | 38 S/AN (70/30) | 80/150 300–600** |
| B5 | 60 n-butyl acrylate | | 40 S/AN | 110 |

*Prepared according to (4), with 82% of grafted PMMA and 18% of non-grafted PMMA
**Bimodal particle size distribution

EXAMPLE 1

The improvement of high impact polystyrene in terms of impact strength, resistance to R11 and adhesion to foam as a result of the addition of component B1 is evident from the following results (Table 1).

| A1 (% by wt.) | B1 (% by wt.) | Rubber content (RC) (% by wt.) | $a_{KL}$ (kJ/m²) | RE (%) | Adhesion to foam |
|---|---|---|---|---|---|
| (Comp.) | | | | | |
| 100 | — | 8 | 10.5 | 10 | — (Comp.) |
| 86.4 | 13.6 | 15 | 13.0 | 48 | + according to the invention |
| 67.2 | 32.8 | 25 | 22.0 | 49 | + according to the invention |

COMPARATIVE INVESTIGATION FOR EXAMPLE 1

The effect obtained, i.e. the achievement of partial compatibility, as a result of introducing an intermediate grafting step with polystyrene is described. The emulsion graft rubbers B4 and B5 which serve for comparison and have a pure SAN shell gave no improvement in the impact strength but caused the toughness to decrease without increasing the rigidity, regardless of the particle size (in contrast to B1).

| A1 (% by wt.) | B4 (% by wt.) | B5 (% by wt.) | RC (% by wt.) | $a_{KL}$ (kJ/m²) | RD (%) | |
|---|---|---|---|---|---|---|
| 100 | — | — | 8 | 10.5 | 27.9 | Comparison |
| 86.9 | 13.1 | — | 15 | 10.0 | 12.9 | according to the invention |
| 68.4 | 31.6 | — | 25 | 12.0 | 5.7 | Comparison |
| 86.4 | — | 13.6 | 15 | 9.4 | 11.6 | Comparison |
| 67.2 | — | 32.8 | 25 | 10.0 | 13.3 | Comparison |

EXAMPLE 2

Here, a high impact polystyrene (A2) which is already considered resistant to stress cracking is used to demonstrate how, in addition to the other properties (impact strength, low temperature impact strength at −40° C. and adhesion to foam), the stress cracking resistance can be further improved by adding B1.

| A2 (% by wt.) | B1 (% by wt.) | RC (% by wt.) | $a_{KL}$ (kJ/m²) | $a_{KL}$ −40° C. (kJ/m²) | EB (%) | RE (%) | Adhesion to foam |
|---|---|---|---|---|---|---|---|
| 100 | — | 8 | 9.9 | 7.1 | 28.4 | 75 | Comparison |
| 86.4 | 13.6 | 15 | 15.6 | 9.9 | 27.1 | 105 | + according to the invention |
| 67.2 | 32.8 | 25 | 28.5 | 13.8 | 39.5 | 99 | + according to the invention |

EXAMPLE 3

In a comparison, this Example shows the superiority of B1 (S/SAN-grafted) over acrylate-grafted emulsion rubbers (B2 and B3) in a multiaxial penetration test on injection molded circular disks under conditions similar to those encountered in practice. It is known that this test is a very sensitive test for incompatibility.

| A1 (% by wt.) | B1 (% by wt.) | B2 (% by wt.) | B3 (% by wt.) | RC (% by wt.) | $a_{KL}$ (kJ/m²) | $W_{tot}$ (Nm) | |
|---|---|---|---|---|---|---|---|
| 100 | — | — | — | 8 | 10.5 | 10.9 | Comparison |
| 86.4 | 13.6 | — | — | 15 | 13.0 | 8.6 | according to the invention |
| 67.2 | 32.8 | — | — | 25 | 22.0 | 13.7 | according to the invention |

-continued

| A1 (% by wt.) | B1 (% by wt.) | B2 (% by wt.) | B3 (% by wt.) | RC (% by wt.) | $a_{KL}$ (kJ/m$^2$) | $W_{tot}$ (Nm) | |
|---|---|---|---|---|---|---|---|
| 87.6 | — | 12.4 | — | 15 | 12.0 | 6.3 | Comparison |
| 70.1 | — | 29.9 | — | 25 | 27.0 | 10.4 | Comparison |
| 89 | — | — | 11 | 15.7 | 14.3 | 3.3 | Comparison |
| 78 | — | — | 22 | 23.4 | 24.9 | 8.1 | Comparison |

We claim:

1. A molding material comprising a matrix of high impact polystyrene and rubber incorporated in the form of discrete particles, containing
   (A) not less than 50% by weight of polystyrene A and
   (B) an effective amount of up to 50% by weight of a graft rubber B of
      ($b_1$) of 40 to 95% by weight of an elastomeric core $b_1$ and
      ($b_2$) from 5 to 60% by weight of a shell $b_2$, i.e.
      ($b_{21}$) from 5 to 50% by weight of a first shell $b_{21}$ of styrene and
      ($b_{22}$) from 50 to 95% by weight of a second shell $b_{22}$ of
         ($b_{221}$) from 60 to 90% by weight of styrene $b_{221}$ and
         ($b_{222}$) from 10 to 40% by weight of acrylonitrile $b_{222}$, A and B, $b_1$ and $b_2$, $b_{21}$ and $b_{22}$ and $b_{221}$ and $b_{222}$ summing in each case to 100% by weight.

2. A molding material as claimed in claim 1, which has the following composition:
from 60 to 90% by weight of A,
from 10 to 40% by weight of B,
from 50 to 90% by weight of $b_1$,
from 10 to 50% by weight of $b_2$,
from 7 to 40% by weight of $b_{21}$,
from 60 to 93% by weight of $b_{22}$,
from 65 to 85% by weight of $b_{221}$ and
from 15 to 35% by weight of $b_{22}$.

* * * * *